Oct. 6, 1925.

S. G. HUDSON 1,555,847

SCAFFOLDING CLAMP

Filed March 17, 1924

INVENTOR.
Sidney. G. Hudson.

BY
Clayton E. Wyrick
ATTORNEY.

Patented Oct. 6, 1925.

1,555,847

UNITED STATES PATENT OFFICE.

SIDNEY GEORGE HUDSON, OF DETROIT, MICHIGAN.

SCAFFOLDING CLAMP.

Application filed March 17, 1924. Serial No. 699,726.

*To all whom it may concern:*

Be it known that I, SIDNEY GEORGE HUDSON, a citizen of Great Britain, and residing at Detroit, county of Wayne and State of Michigan, have invented a new and Improved Scaffolding Clamp, of which the following is a specification.

This invention relates to scaffolding clamps, and has for one of its objects the provision of a clamp by means of which two end-wise adjoining members, as for example, scaffolding timbers, may be rigidly connected quickly and without the use of nails and in a manner providing for quick detachment of said members.

Another object of the invention is to provide a sleeve adapted to embrace adjoining ends of two timbers, and carrying clamping screws to rigidly secure said sleeve to said ends, and to further provide one or more plates for transmitting to said timbers the clamping stress exerted by said screws, said plates being permanently connected to said sleeve.

The above and other objects will be apparent from the following description wherein reference is made to the accompanying drawings, illustrating a preferred embodiment of my invention.

Figure 1:
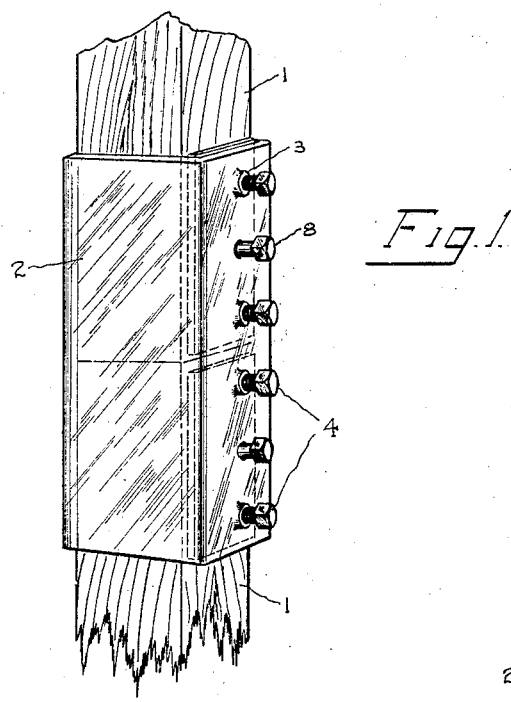
Figure 1 is a perspective view of the improved clamp in use.
Figure 2:
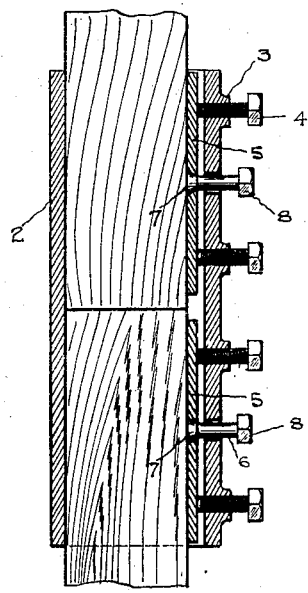
Figure 2 is a longitudinal sectional view of the same.
Figure 3:
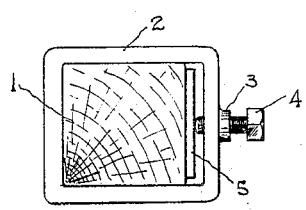
Figure 3 is an end view.

In these views, the reference character 1 designates two end-wise abutting timbers, and 2 a metal sleeve embracing the adjoined end portions of said timbers. Said sleeve may be an iron or steel casting and has exteriorly formed upon one of its walls a longitudinal series of bosses 3.

4 are clamping screws which rigidly secure the sleeve 2 to the timbers 1, passing through the bosses 3. A pair of plates 5, which may be formed of heavy sheet-metal distribute the clamping stress over a considerable surface of the joined timbers, each of said plates being preferably engaged by two of the screws 4 at points adjacent its ends.

6 are bolts whereby the plates 5 are held within the sleeve 2 when the clamps are not in use. Said bolts pass loosely through the sleeve 2, preferably at points midway between the screws 4. Each of said bolts passes through one of the plates 5, and has a head 7 countersunk in the inner face of said plate, and a nut 8 or the like is secured upon the outer end of said bolt.

From the preceding description, it is evident that the invention may be quite quickly applied to or removed from adjoined timbers, and it will further appear that the clamping connections established by the invention is very secure. The plates 5 distribute the clamping stress of the screws 4 over a sufficient area of the timbers 1 to avoid any tendency of the latter to split and said plates are so connected to the sleeve 2 by the bolts 6 that their proper positions within the sleeve will be maintained even when the clamping device is not in use.

From the foregoing description it becomes evident that the device is very simple and efficient in operation, will not easily get out of order, and provides a device which accomplishes the objects described.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having thus described my invention, I claim:

1. A clamp for end-wise adjoining members comprising a sleeve adapted to embrace the ends of the adjoined members, clamping screws carried by said sleeve for securing it to said members, a clamping plate arranged to transmit the thrust of one of said screws to one of said adjoining members, and means other than said clamping screws permanently securing said plate to said sleeve.

2. A clamp for end-wise adjoining members comprising a sleeve adapted to embrace the ends of the adjoined members, clamping screws carried by said sleeve for securing it to said members, a pair of clamping plates for distributing the thrust of said screws independently to the two timbers and bolts loosely carried by said sleeve and mounting the plates permanently within the sleeve.

3. A clamp for end-wise adjoining members comprising an element adapted to cross the joint between said members said element having portions for embracing said members, clamping screws carried by said element for rigidly securing it to said members, and plates transmitting the thrust of said screws to said members, and means other than said screws mounting said plates loosely upon said element.

In witness whereof I hereunto set my hand.

SIDNEY GEORGE HUDSON.